United States Patent
Lavoie

(10) Patent No.: US 6,820,912 B1
(45) Date of Patent: Nov. 23, 2004

(54) VEHICLE SEAT LATCH ASSEMBLY HAVING MOLDED CINCH MEMBER

(75) Inventor: Scott Lavoie, Red Oak, IA (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/426,311

(22) Filed: Apr. 30, 2003

(51) Int. Cl.[7] ................................................. B60N 2/04
(52) U.S. Cl. ............................ 296/65.03; 292/DIG. 73; 248/503.1
(58) Field of Search ............... 296/65.03; 292/DIG. 73; 248/503.1

(56) References Cited

U.S. PATENT DOCUMENTS

| | | | |
|---|---|---|---|
| 4,073,519 A | 2/1978 | Kurozu et al. | |
| 4,358,141 A | 11/1982 | Hamada | |
| 4,639,040 A | 1/1987 | Fujita et al. | |
| 4,756,564 A | 7/1988 | Ikeda | |
| 4,759,580 A | * 7/1988 | Berklich et al. | 296/65.03 |
| 4,783,103 A | 11/1988 | Schlegel | |
| 4,838,513 A | 6/1989 | Kondo | |
| 5,125,711 A | 6/1992 | Syed et al. | |
| 5,632,517 A | 5/1997 | Paulik et al. | |
| 6,022,166 A | 2/2000 | Rogers, Jr. et al. | |
| 6,024,411 A | 2/2000 | Pesta et al. | |
| 6,036,252 A | * 3/2000 | Hecksel et al. | 296/65.03 |
| 6,039,401 A | 3/2000 | Rus | |
| 6,161,890 A | 12/2000 | Pesta et al. | |
| 6,196,610 B1 | 3/2001 | Pesta et al. | |
| 6,227,619 B1 | 5/2001 | Pesta et al. | |
| 6,283,550 B1 | 9/2001 | Vialatte et al. | |
| 6,361,098 B1 | 3/2002 | Pesta et al. | |
| 6,375,245 B1 | 4/2002 | Seibold et al. | |
| 6,412,849 B1 | 7/2002 | Fast | |

* cited by examiner

Primary Examiner—Joseph D. Pape
(74) Attorney, Agent, or Firm—Clark Hill PLC

(57) ABSTRACT

A vehicle seat latch assembly including a structural latch member having a first engagement surface that is adapted to secondarily engage a striker. A deformable latch member is attached to the structural latch member and has a second engagement surface that extends beyond the first engagement surface for primary engagement with the striker. The second engagement surface has a greater offset angle derived from a pivot point than the offset angle of the first engagement surface derived from the pivot point.

17 Claims, 2 Drawing Sheets

VEHICLE SEAT LATCH ASSEMBLY HAVING MOLDED CINCH MEMBER

FIELD OF THE INVENTION

Vehicle seat latch assemblies, and more particularly to vehicle seat latch assemblies having a molded cinch member.

BACKGROUND OF THE INVENTION

It is known in the art that motor vehicles often incorporate seat assemblies that are capable of pivoting to increase the amount of cargo space available in the vehicle. Typically, known prior art seat assemblies include a frame assembly that is adapted to be pivotally mounted to the floor of the vehicle to support a seat assembly. The seat frame assembly generally includes support structure including side support arms front and back supports and a seat back support spacing apart the side support arms. The seat frame assembly also includes two seat back legs and two stationary seat front legs. Latch assemblies typically associated with the two seat back legs are used to attach to floor strikers permanently attached to the floor of the vehicle. The seat back legs are adapted to be rotatably attached to the seat back end on each side of the side support arms. The stationary front legs are pivotally mounted to the front end of each of the side support arms allowing the seat frame assembly to pivot about the stationary front legs relative to the vehicle floor.

Typical assemblies include multiple latch mechanisms associated with each side of a seat assembly. Generally, a structural latch and an anti-rattle latch are each utilized for each seat back leg. The multiple latch assemblies provide a secure cinching of the seat assembly to a floor striker, as well as prevents rattle of the seat assembly due to vibrations of the vehicle. The multiple latches increase the overall cost of a seat assembly, as well as increase the manufacturing costs of a vehicle.

There is therefore a need in the art for a latch mechanism that utilizes only one latch to structurally cinch the seat assembly to a floor of a vehicle, as well as to provide anti-rattle characteristics.

There is also a need in the art for a vehicle seat latch assembly that cinches or attaches to strikers in the vehicle floor, does not rattle and is easily unlatched by a user using a minimal amount of force.

SUMMARY OF THE INVENTION

The vehicle seat latch assembly of the present invention solves the deficiencies and needs of the prior art by providing a vehicle seat latch assembly including a structural latch member having a first engagement surface that is adapted for secondary engagement with a striker. A deformable latch member is attached to the structural latch member. The deformable latch member has a second engagement surface that extends beyond the first engagement surface for primary engagement with the striker. The second engagement surface has a greater offset angle derived from a pivot point than an offset angle of the first engagement surface derived from the pivot point.

The deformable latch member is attached to the structural latch member and engages the striker in a first position. The deformable latch member collapses in response to a force exerted on the vehicle latch assembly to a second position wherein the structural latch member engages a striker.

BRIEF DESCRIPTION OF THE DRAWINGS

These and other features of the invention will appear from the following description and from the drawings in which.

DESCRIPTION OF THE PREFERRED EMBODIMENTS

Figure 1:
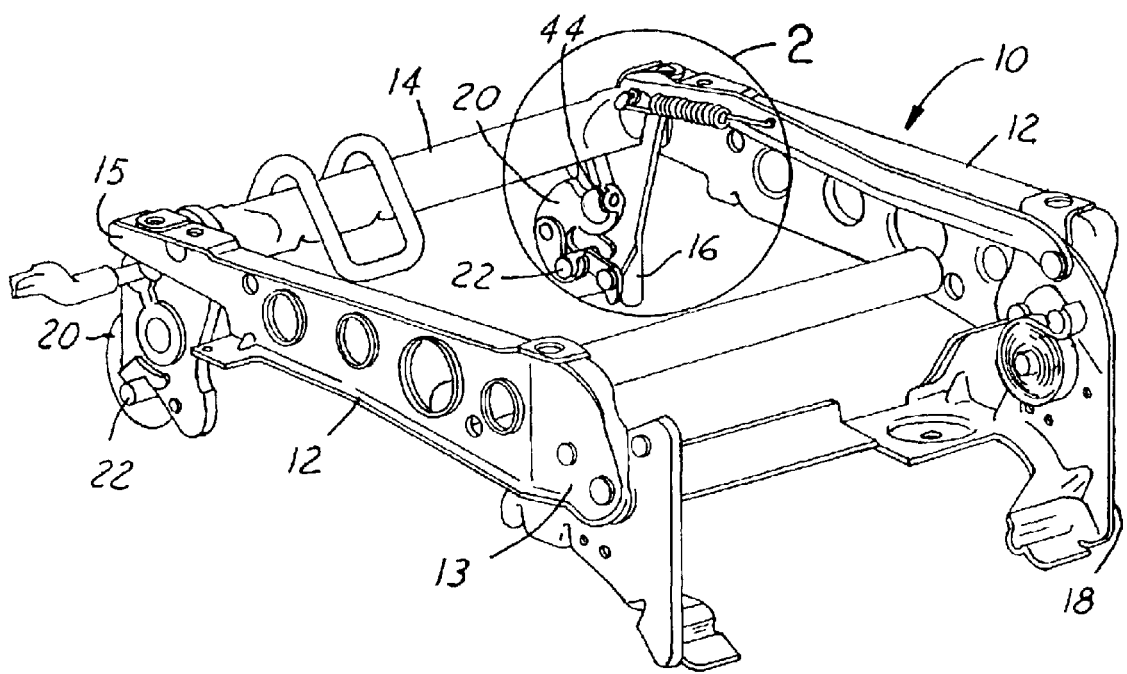
FIG. 1 is an environmental perspective view of the vehicle seat latch assembly of the present invention incorporated into a seat frame assembly.
Figure 2:
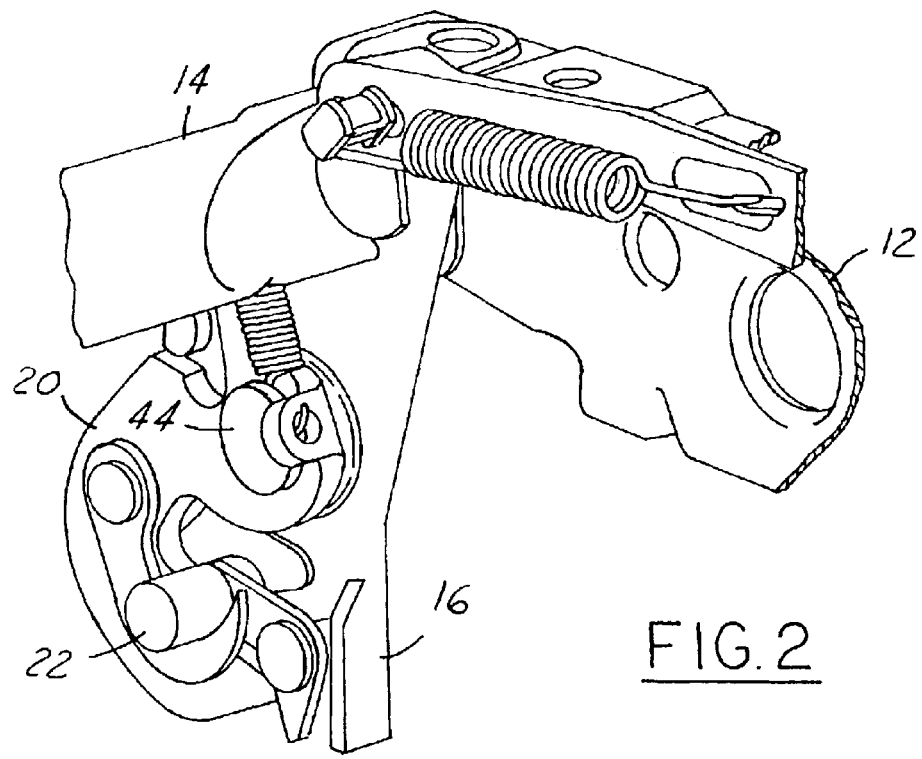
FIG. 2 is an enlarged perspective view of the seat latch assembly shown in FIG. 1.

Referring to FIGS. 1 and 2, a seat cushion frame assembly is generally shown at 10. The seat cushion frame assembly 10 is adapted to be pivotally mounted to the floor of the vehicle for supporting the seat cushion frame assembly 10 and occupant within the vehicle. The seat cushion frame assembly 10 includes two side support arms 12, having a seat front end 13 and a seat back end 15, and a seat back support 14 attached between the seat back ends 15 of the side support arms 12, thereby connecting and spacing apart the side support arms 12. The seat cushion frame assembly 10 further includes two seat back legs 16, two stationary front legs 18, latch assemblies 20, and floor strikers 22. A seat cushion frame assembly 10 is adapted to attach to the vehicle floor by the two seat back legs 16 and the two seat front legs 18. The seat back legs 16 are adapted to be rotatably attached to the seat back end 15 of each of the side support arms 12. The two stationary seat front legs 18 are pivotally mounted to the front end 13 of each of the two side support arms 12 allowing the seat cushion frame assembly 10 to pivot about the stationary seat legs 18 relative to the vehicle floor. The floor strikers 22 are adapted to be mounted to the floor of the vehicle and engage the latch assemblies 20 as will be discussed in more detail below.

The latch assemblies 20 include a structural steel latch member 30 and a deformable latch member 40, both of which are operatively attached to the seat back legs 16.

Figure 3:
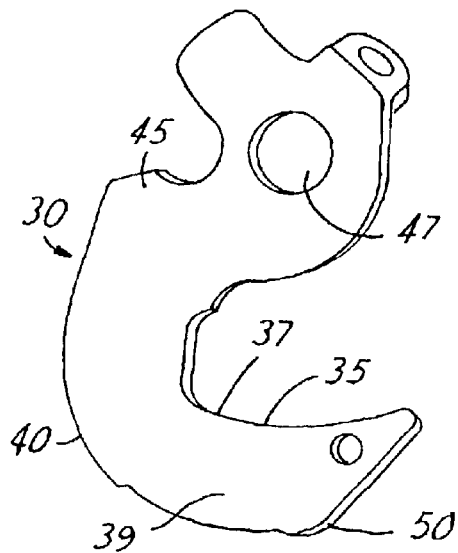
FIG. 3 is a perspective view showing the structural latch member of the vehicle seat latch assembly.
Figure 4:
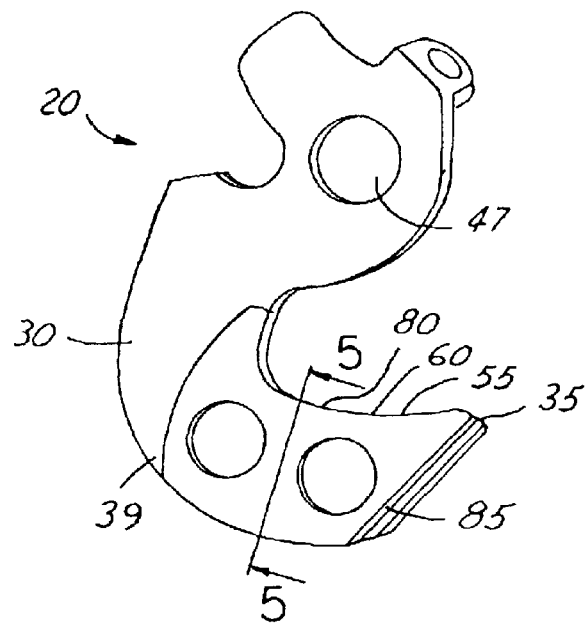
FIG. 4 is a perspective view of a second embodiment of the invention detailing the structural latch member having a deformable latch member attached to both sides of the structural latch member.

Referring to FIG. 3, there is shown a structural latch member 30 that has a first engagement surface 35 that is adapted for secondary engagement with the striker 22. In a preferred aspect, the structural latch member 30 comprises a hook shaped body 40 having a shank portion 45 terminating in a curved portion 50. The shank portion 45 includes a slot 47 formed there through for pivotally engaging the seat frame 10; thereby defining the pivot point 44 of the vehicle latch assembly 20. The first engagement surface 35 is formed on an upper edge 37 of the curved portion 50 and is bounded by opposing side surfaces 39 of the structural latch member 30.

Figure 6:
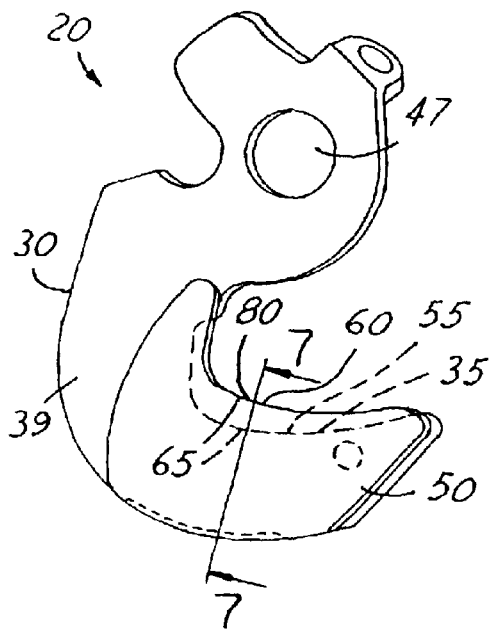
FIG. 6 is a perspective view detailing a first embodiment of a structural latch member having a deformable latch member attached to one side of the structural latch member.
Figure 5:
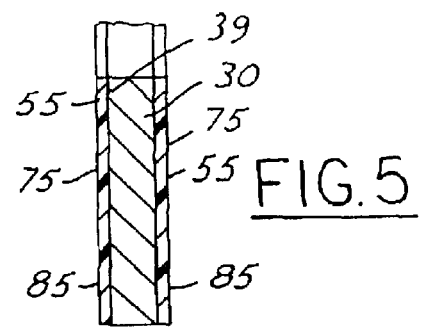
FIG. 5 is a sectional view of the structural latch member and deformable latch member shown in FIG. 4.
Figure 7:
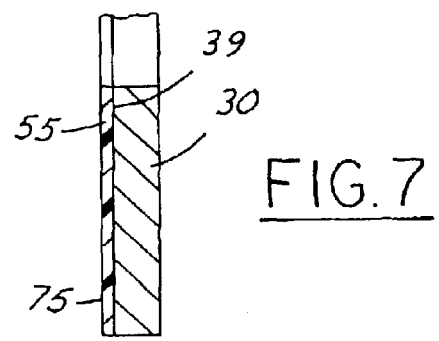
FIG. 7 is a sectional view of the structural latch member and deformable latch member shown in FIG. 6.

Referring to FIGS. 5, 6 and 7, there is shown a first embodiment of the vehicle seat latch assembly 20 of the present invention. The vehicle seat latch assembly 20 includes a structural latch member 30, as previously described with reference to FIG. 3 and a deformable latch member 55 attached to the structural latch member 30. The deformable latch member 55 has a second engagement surface 60 extending beyond the first engagement surface 35 of the structural latch member 30 for primary engagement with a striker 22, as best seen in FIGS. 1 and 2. The second engagement surface 60 has a greater offset angle derived from a pivot point 44 than an offset angle of the first engagement surface 35 derived from the pivot point 44. The offset angle, as the term is utilized in the specification refers to the angle formed between the center line of the arc 65 comprising the first or second engagement surfaces and the center line of the pivot 44 defined by the slot 47 referenced above. Therefore, the angle between the center line of the arc 65 comprising the second engagement surface formed 60 on the deformable latch member 55 has a greater angle than the angle formed by the center line of the arc 70 comprising the first engagement surface 35 both with reference to the center line of the pivot point 44. The relationship of the second engagement surface 60 having a greater offset angle than the first engagement surface 35 allows for a person to more easily release the latch mechanism due to the increased angle when the striker 22 interfaces with the second engagement surface 60 for the primary engagement of the vehicle seat latch assembly 20. In a preferred aspect of the present invention, the second engagement surface 60 has an offset angle ranging from 6.0 to 8.5 degrees, preferably with a 7.5 degree offset angle, while the first engagement surface 35 preferably has an offset angle in the range from 0 to 3 degrees preferably with a 3 degree offset angle.

The deformable latch member 55 preferably comprises a planar body 75 attached to the curve portion 50 of the structural latch member 30 and extending upward beyond the first engagement surface 35 wherein the second engagement surface 60 is defined by a terminal edge 80 of the planar body 75.

In a preferred aspect of the present invention the deformable latch member 55 comprises a resilient flexible plastic and particularly preferred is Hytrel™ sold by Dupont Chemical Corporation.

In use, the deformable latch member 55 that is attached to the structural latch member 30 engages the striker 22 in a first position. This position allows for the easy manipulation of the latch assembly 20 or disengagement of the latch mechanism 20 by a person due to the increased offset angle of the second engagement surface 60 of the deformable latch member 55 engaging the striker 22 in its first position. The deformable latch member 55 collapses in response to a force to move to a second position wherein the deformable latch member 55 moves away from the striker 22 to allow engagement of the structural latch member 35 with the striker 22. The smaller offset angle of the first engagement surface 35 of the structural latch member 30 prevents the backing away of the structural latch member 30 from the striker 22 when an increased force or load is applied to the seat. In this manner, the vehicle seat latch assembly 20 incorporating the deformable latch member 55 and the structural latch member 30 provides an anti-rattle function due to the primary engagement of the striker 22 with the plastic material of the second engagement surface 60 thereby dampening vibrations or rattles. The vehicle seat latch assembly 20 further provides a latch mechanism that is easily manipulated by a user, but remains securely cinched to a striker 22 when an increased force is applied to the seat, due to the lower offset angle 22 of the first engagement surface 35 of the structural latch member 30.

Referring to FIGS. 6 and 7, there is shown a second embodiment of the vehicle seat latch assembly 20 of the present invention. The latch assembly 20 is similar in structure to the first embodiment, outlined above with the exception that the deformable latch member 35 comprises a pair 85 of planar bodies attached to the curved portion 50 of the structural latch member 30 on opposing side surfaces of the structural latch member and extend, as previously discussed, on the planar bodies 75 upward beyond the first engagement surface 35 wherein the second engagement surface 55 is defined by the terminal edges 80 of both of the planar bodies 75. In all other respects, the second embodiment is similar to that of the previously described first embodiment.

While preferred embodiments are disclosed, a worker in this art would understand that various modifications would come within the scope of the invention. Thus, the following claims should be studied to determine the scope and content of the invention.

What is claimed is:

1. A vehicle seat latch assembly comprising:
    a structural latch member having a first engagement surface adapted for secondary engagement with a striker;
    a deformable latch member attached to the structural latch member, the deformable latch member having a second engagement surface extending beyond the first engagement surface for primary engagement of the striker;
    the second engagement surface having a greater offset angle derived from a pivot point than an offset angle of the first engagement surface derived from the pivot point.

2. The vehicle seat latch assembly of claim 1 wherein the structural latch member comprises a hook shaped body having a shank portion terminating in a curved portion.

3. The vehicle seat latch assembly of claim 2 wherein the shank portion includes a slot formed therethrough for pivotally engaging a seat frame.

4. The vehicle seat latch assembly of claim 2 wherein the first engagement surface is formed on an upper edge bounded by opposing side surfaces of the curved portion.

5. The vehicle seat latch assembly of claim 2 wherein the deformable latch member is attached to at least one opposing side surface of the curved portion.

6. The vehicle seat latch assembly of claim 5 wherein the deformable latch member is attached to both opposing side surfaces.

7. The vehicle seat latch assembly of claim 5 wherein the deformable latch member comprises a planar body attached to the curved portion and extending upward beyond the first engagement surface wherein the second engagement surface is defined by a terminal edge of the planar body.

8. The vehicle seat latch assembly of claim 6 wherein the deformable latch member comprises a pair of planar bodies attached to the curved portion on the opposing side surfaces and extending upward beyond the first engagement surface wherein the second engagement surface is defined by terminal edges of the planar bodies.

9. A vehicle seat latch assembly comprising:
    a striker;
    a structural latch member having a first engagement surface for secondary engagement with the striker;
    a deformable latch member attached to the structural latch member, the deformable latch member having a second engagement surface extending beyond the first engagement surface for primary engagement with the striker in a first position and maintaining the first engagement surface of the structural latch member spaced from the striker in the first position;

the deformable latch member collapsing in response to a force to a second position wherein the structural latch member engages the striker and provides secondary engagement between the first engagement surface and the striker.

10. The vehicle seat latch assembly of claim 9 wherein the structural latch member comprises a hook shaped body having a shank portion terminating in a curved portion.

11. The vehicle seat latch assembly of claim 10 wherein the shank portion includes a slot formed therethrough for pivotally engaging a seat frame.

12. The vehicle seat latch assembly of claim 10 wherein the first engagement surface is formed on an upper edge bounded by opposing side surfaces of the curved portion.

13. The vehicle seat latch assembly of claim 10 wherein the deformable latch member is attached to at least one opposing side surface of the curved portion.

14. The vehicle seat latch assembly of claim 13 wherein the deformable latch member is attached to both opposing side surfaces.

15. The vehicle seat latch assembly of claim 13 wherein the deformable latch member comprises a planar body attached to the curved portion and extending upward beyond the first engagement surface wherein the second engagement surface is defined by a terminal edge of the planar body.

16. The vehicle seat latch assembly of claim 14 wherein the deformable latch member comprises a pair of planar bodies attached to the curved portion on the opposing side surfaces and extending upward beyond the first engagement surface wherein the second engagement surface is defined by terminal edges of the planar bodies.

17. A vehicle seat latch assembly comprising:
   a structural latch member comprising a hook shaped body having a shank portion terminating in a curved portion;
   a striker;
   a deformable latch member attached to the structural latch member and engaging the striker in a first position;
   the deformable latch member collapsing in response to a force to a second position wherein the structural latch member engages the striker.

* * * * *